July 4, 1967 — A. J. PETROS — 3,328,991
BELT WRAPPERS
Filed June 30, 1964

INVENTOR
Andrew J. Petros
his Attorneys

United States Patent Office 3,328,991
Patented July 4, 1967

3,328,991
BELT WRAPPERS
Andrew J. Petros, Oakdale, Pa., assignor to Mesta Machine Company, a corporation of Pennsylvania
Filed June 30, 1964, Ser. No. 379,314
3 Claims. (Cl. 72—148)

This invention relates to a belt wrapper for confining strip material to a coiling mandrel to form a coil. Belt wrappers are commonly used in coiling steel strip but are of general utility in flat strip material.

Prior to this invention an endless belt engaging a coil around a mandrel was used to wrap strip material around the mandrel to form the coil. The belt guides or rollers in contact with the belt were housed or supported in such a manner so as to require disassembling of the particular unit in order to replace the belt.

In order to overcome fluctuations in tension within the belt, previous belt wrappers employed springs for belt take-up. The difficulty with springs is that as they become loaded they increase the tension on the belt which results in stretching the belt.

The present invention overcomes these difficulties by providing a belt wrapper unit in which the belt can be replaced without removing any of the belt wrapper assemblies. A tension control device insures a uniform tension throughout the belt as the coil is being wound on the mandrel.

I provide an apparatus for wrapping an advancing sheet of material around a mandrel to form a coil comprising an endless belt, a first plurality of belt guides in contact with the face of the belt, the guides positioned so that the belt partially encircles the coil being wrapped around the mandrel with the back of the belt in contact with the coil being formed, a second plurality of belt guides in contact with the face of the belt remote from the coil being formed, and means supporting all of the belt guides from a common point whereby all the belt guides are cantilevered.

I preferably provide that the means supporting all of the belt guides comprises a frame having a plurality of projections from a common point, each projection supporting a belt guide whereby all of the belt guides are cantilevered. The frame is in the form of an H having four projections. One end of the H frame has its projections converging toward each other while at the other end the projections diverge with respect to each other. The belt guides are mounted at the ends of the projections. The coil is extended into the H frame at the end where the projections diverge.

I provide a tension element in contact with the belt and a means urging the tension element against the belt tending to keep a uniform tension in the belt.

Other details, objects and advantages of the invention will become apparent as the following description of a present preferred embodiment thereof proceeds.

Figure 2:
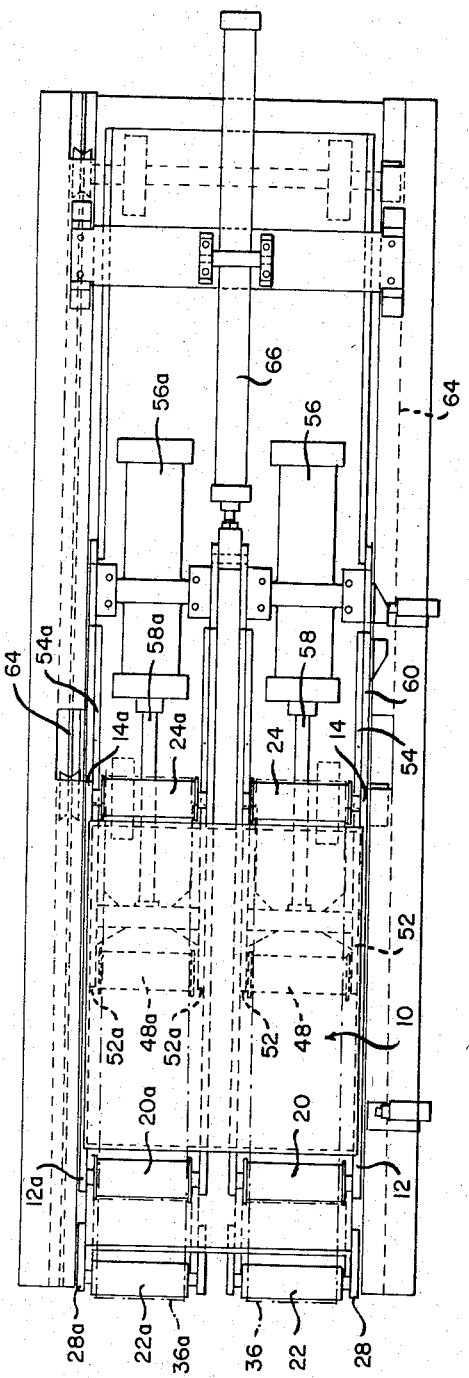
Figure 1:
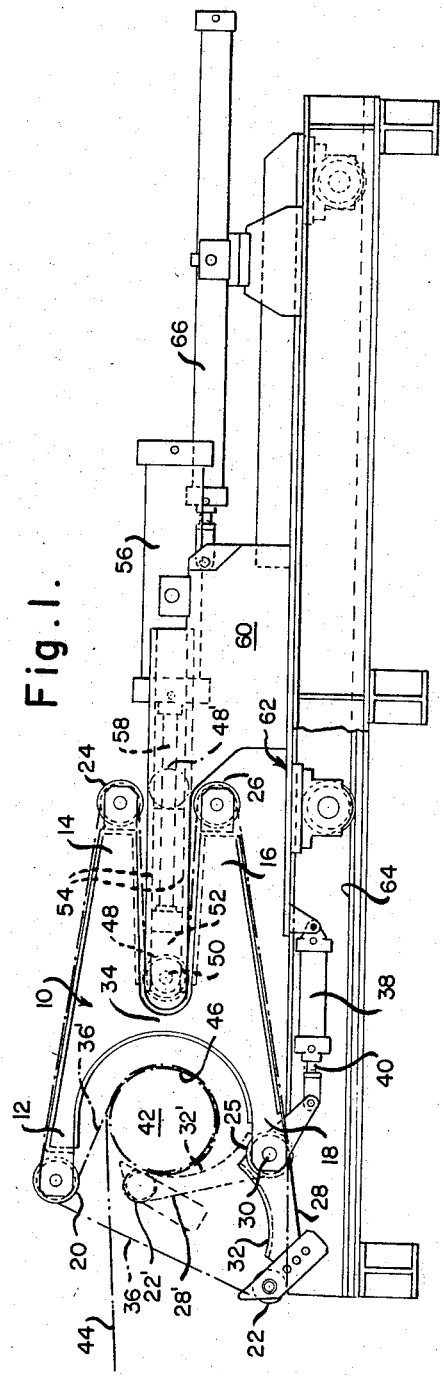

In the accompanying drawings I have shown a present preferred embodiment of my invention in which FIGURE 1 is a side elevational view of the belt wrapper; and FIGURE 2 is a top plan view of the belt wrapper shown in FIGURE 1.

FIGURES 1 and 2 show a double belt wrapper. One half of the double belt wrapper is identical with the other half. Reference numerals with the letter *a* following represents the corresponding half with the same numerals. Only the half without the letter *a* following the reference numerals will be discussed.

An H frame 10 having projections 12, 14, 16 and 18 support a first pair of belt guide rollers hereinafter referred to as rollers 20 and 25 and a second pair of rollers 24 and 26. Roller 22 is an auxiliary roller supported at projection 18 through an auxiliary arm 28 which is pivotally mounted at pivot 30 on projection 18. The inside surface 32 of auxiliary arm 28 is arcuate in shape. The H of the H frame is formed by projections or legs 12, 14, 16 and 18 and supported from a common point or center 34. Projections 12 and 18 are cantilevered in a diverging relationship with respect to each other and projections 14 and 16 are cantilevered in a converging relationship with respect to each other. An endless belt 36 is guided around the H frame 10 by rollers 20, 24, 26, 25 and 22. A hydraulic center 38 and piston rod 40 bias the auxiliary arm toward roller 20. A mandrel 42 is urged against the back of the belt 36 and is inserted into the arcuate portion of the H frame. The belt 36' is shown wrapping a piece of strip metal 44 around mandrel 42 forming coil 46. The auxiliary arm 28 is pivoted so that the inside surface 32 partially encircles the coil 46. The new position of the auxiliary arm 28 and roller 22 when the mandrel is inserted is shown as 28', 32' and 22'. A tension roller 48 contacts the back of the belt 36. The tension roller 48 has a shaft 50 fixedly mounted on either end to a plate 52 and is supported slidably in trackway 54. An air cylinder 56 has a piston rod 58 coupled to slidable plate 52. A regulated source of air to the air cylinder 56 insures a constant p.s.i. against the piston rod 58 whereby a uniform tension is present at all times on the belt 36. As the diameter of the coil 46 increases, the tension on the belt 36 increases causing the tension roller to move away from the H frame 10 and approach the position shown as 48'. Whenever the tension in the belt 36 is least, the tension roller 48 is extended to its furthermost position in the supporting frame 60 into the H frame 10. Any variation in tension on the belt 36 is immediately compensated for by the roller 48 moving along trackway 54. The tension roller supporting frame 60 and the H frame 10 are fixedly mounted to a slidable base generally referred to as 62. The movable base 62 rolls on a fixed trackway support 64. A hydraulic cylinder 66 mounted to the tension roller support frame 60 slides the slidable base 62 on the trackway support 64. The slidable base 62 is moved laterally until the mandrel 42 is engaged and the belt almost entirely encircles the circumference of the mandrel 42.

The cantilevered H frame 10 and the tension roller support frame 60 partially engaging the H frame permits an endless belt to be replaced by sliding the new belt along the axis of the rollers 20, 24, 48, 26, 25 and 22 without removing any parts. The tension roller 48 keeps a uniform tension on the belt 36 and reduces wear and breakage of the belt 36.

While I have shown and described a present preferred embodiment of the invention, it is to be distinctly understood that the invention is not limited thereto but may be otherwise variously embodied within the scope of the following claims.

I claim:

1. An apparatus for wrapping an advancing sheet of material around a mandrel to form a coil comprising:
   (a) An endless belt;
   (b) A first pair of rollers in contact with the face of the belt;
   (c) A second pair of rollers in contact with the face of the belt;
   (d) An H frame having four projections, one end of the frame supporting the first pair of rollers on two projections, the other end of the frame supporting the second pair of rollers on the other two projections;
   (e) A pivot on one of the two projections supporting the first pair of rollers;

(f) An arcuate auxiliary arm mounted to the pivot on the projection;

(g) An auxiliary roller mounted on the auxiliary arm on the end opposite the pivot, when the coil around the mandrel is forced against the back of the belt in proximity to the auxiliary roller, the auxiliary arm is pulled to a position causing the belt to partially encircle the coil being wrapped around the mandrel;

(h) A tension element in contact with the back of the belt;

(i) Means urging the tension member against the belt to keep a uniform tension in the belt; and (j) Pressure fluid means acting on the auxiliary arm moving it from an extended position to a position partially encircling the mandrel.

2. An apparatus for wrapping an advancing sheet of material around a mandrel to form a coil comprising:

(a) An endless belt;

(b) A first pair of belt rollers in contact with the face of the belt, the rollers positioned so that the belt partially encircles the coil being wrapped around the mandrel with the back of the belt in contact with the coil being formed;

(c) A second pair of belt rollers in contact with the face of the belt remote from the coil being formed;

(d) An H frame having four projections, two projections at one end of the frame diverge with respect to each other, the first pair of belt rollers mounted on the diverging projections, the other two projections at the opposite end of the H frame converge with respect to each other, the second pair of belt rollers are mounted on the converging projections;

(e) A tension element in contact with the back of the belt;

(f) Means urging the tension roller against the belt tending to keep a uniform tension in the belt;

(g) A pivot on one of the two projections supporting the first pair of rollers;

(h) An arcuate auxiliary arm mounted to the pivot on the projection;

(i) An auxiliary roller mounted on the auxiliary arm on the end opposite the pivot, when the coil around the mandrel is forced against the back of the belt in proximity to the auxiliary roller, the auxiliary arm is pulled to a position causing the belt to partially encircle the coil being wrapped around the mandrel; and (j) Pressure fluid means acting on the auxiliary arm moving it from an extended position to a position partially encircling the mandrel.

3. An apparatus for wrapping an advancing sheet of material around a mandrel to form a coil as recited in claim 2 including:

(a) A slidable base supporting the H frame, the tension roller, and the means urging the tension roller;

(b) A fixed trackway engaging the slidable base; and (c) Means for moving the slidable base enabling the belt to contact the coil around the mandrel.

References Cited

UNITED STATES PATENTS

| | | | |
|---|---|---|---|
| 2,309,781 | 8/1940 | O'Brien | 72—148 |
| 2,357,157 | 8/1944 | Wood | 72—148 |
| 2,725,104 | 11/1955 | Wood | 72—148 |
| 2,981,493 | 4/1961 | Maxmilian | 72—148 |
| 3,228,225 | 1/1966 | Hiegel | 72—148 |

RICHARD J. HERBST, *Primary Examiner.*

A. L. HAVIS, *Assistant Examiner.*